United States Patent Office 2,994,459
Patented Aug. 1, 1961

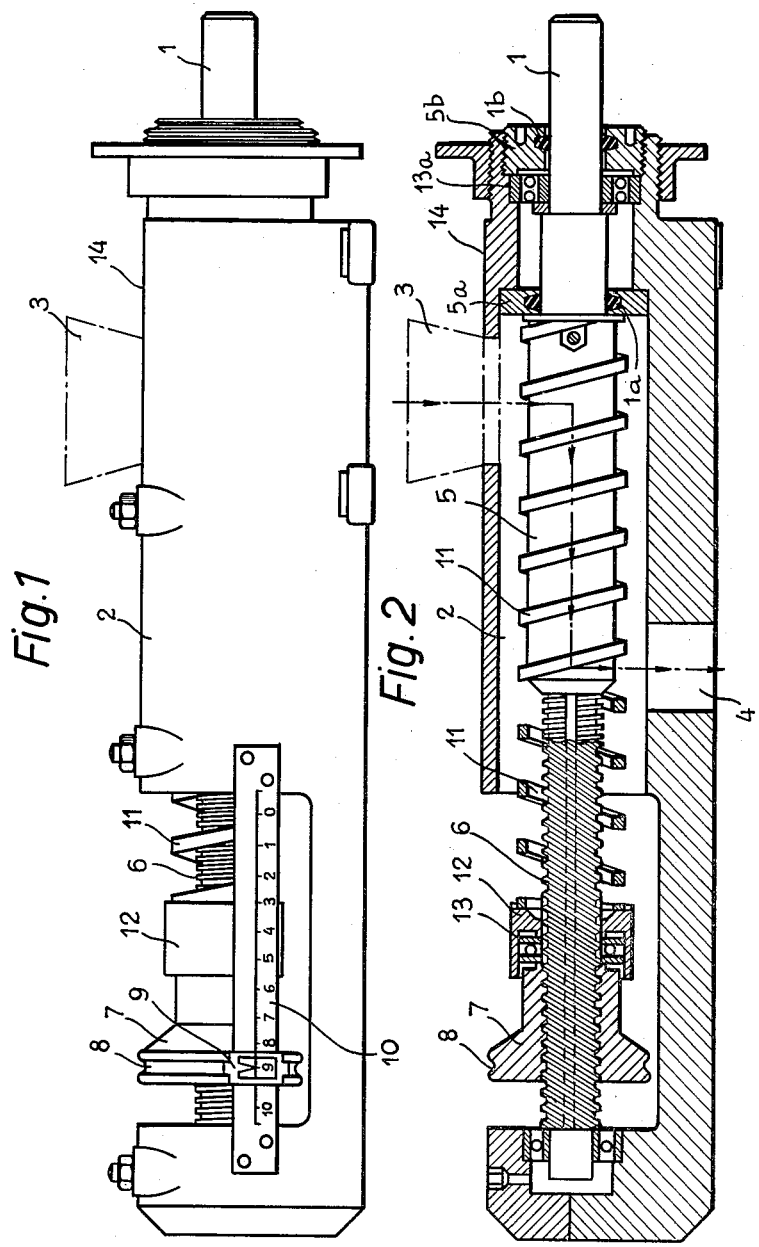

2,994,459
VARIABLE DELIVERY FEEDER
Franco Tedeschi, 266 rua Polona, Sao Paulo, Brazil
Filed July 29, 1958, Ser. No. 751,757
Claims priority, application Brazil July 29, 1957
2 Claims. (Cl. 222—41)

This invention relates to a variable delivery feeder for use in association with various processing machines, such as the machines employed in manufacturing articles from plastic material and other machines utilizing feeders which at a same time measure the volume of a raw stuff supplied.

In known machines equipped with measuring feeders the delivery can be varied by means of special motors controlling the measuring device. However, variations afforded by such devices are of a discontinuous and inaccurate character and do not satisfactorily meet the working requirements of the processing machine.

This invention provides a constant speed feeder by which delivery of the raw stuff can be varied continuously in an adjustable manner to satisfactorily meet any requirements of the machine to which the raw stuff is supplied, which is essential for instance in the manufacture of articles from plastic material, in which the raw stuff supply to the machine should be adjusted depending upon the actual article being manufactured.

The accompanying drawing shows an embodiment of my improved variable delivery feeder by way of example.

On the drawing:
FIGURE 1 is a side view, and
FIGURE 2 is a vertical longitudinal sectional view of the feeder.

The variable delivery feeder comprises a shaft 1 driven by an electric motor connected therewith through a suitable mechanism, or from any other power source. The shaft extends through a chamber 2 having a top inlet chute 3 for the material to be delivered in the desired quantity, the material issuing through the lower passage 4. A section 5 of the shaft 1 extending between the passages 3 and 4 is of larger diameter, the shaft section 6 at the end opposite to the driven section 1 being of smaller diameter and provided with a screw thread for engaging a nut 7 having a circumferential groove or channel 8 receiving a tooth 9 associated with a pointer moving under the action of the nut over a graduated rod 10 on which the load exerted by a helical spring 11 can be directly read. The spring of rectangular cross-section (FIG. 2) is helically wound on the section 5 of the shaft 1 and acts as a scroll conveyor. The delivery of the conveyor will depend upon the rotation speed of the shaft 1 and upon the pitch of the scroll. The pitch of the scroll formed, as set forth above, by the helical spring 11 wound on the section 5 of the shaft 1 can be continuously adjusted by displacing the nut 7 along the section 6 of the shaft 1, whereby any desired variation in delivery rate of the material between the inlet chute and the lower passage 4 may be obtained without necessity to vary the rotation speed of the shaft 1, which can therefore be maintained constant.

In order to facilitate the variation in pitch of the spring 11 acting as a scroll, the spring is secured at one end to the section 5 of the shaft 1, its opposite end abutting an abutment 12 which is carried by a thrust bearing 13 and is freely rotatable on the shaft. The shaft 1 is supported at its other end in bearing 13a. Gasket retainer rings 5a and 5b are respectively mounted on either sides of bearing 13a and support annular gaskets 1a and 1b respectively in contact with the shaft. The rings and the gaskets act as dust shields for the bearing 13a.

The above described feeder affords any desired adjustment in delivery to machines, such as extrusion presses, for the delivery can be controlled thereby even during operation of the machine, always with great ease. A disconnectable top cover plate 14 permits of cleaning the inside of the variable delivery feeder quickly and easily.

What I claim is:
1. A scroll type variable feeder for the delivery of granular material comprising; a longitudinally extending chamber having opposite ends normal to a granular material upper inlet adjacent one of said opposite ends, and a granular material lower outlet adjacent the other of said ends; a shaft mounted for rotation and having an interior shaft section extending longitudinally through said chamber at least from under said inlet to over said outlet, and having an adjoining exterior shaft section extending out of said other end of the chamber adjacent said outlet, said interior shaft section having a larger diameter than the exterior shaft section; a spring of rectangular cross-section helically wound on said shaft and extending along and around the interior and exterior shaft sections, said helical spring having opposite ends and an inner diameter equal to the exterior diameter of the interior shaft section and forming therewith a scroll conveyor, one of said opposite spring ends being secured to the interior shaft section adjacent to said upper inlet, and said scroll conveyor and the chamber defining a helical passageway from said inlet to said outlet through which said granular material is urged when said scroll conveyor is rotated, said passageway being terminated over the chamber outlet by the difference in the diameter of the exterior shaft section and the inner diameter of the helical spring; spring abutment means slidably mounted on said exterior shaft section for abutting the other of said helical spring ends; means for adjustably positioning said spring abutment longitudinally on said exterior shaft section to change the pitch of said helical spring and thus the length of said helical passageway, whereby the rate of delivery of granular material is changed by changing the length of said passageway with said shaft being rotated at a constant speed.

2. A scroll type variable feeder as described in claim 1 characterized in that said means for adjustably positioning said spring abutment means comprises; screw threads on the exterior shaft section; a tapped nut having threads complementary to those on said exterior shaft section for rotatably engaging therewith to form an adjustable stop for said spring abutment; a thrust bearing interposed between the spring abutment and the nut for reducing the thrust friction opposed to the free rotation of said helical spring; and indicating means operatively mounted parallel with said shaft for indicating the relative position of said nut on said exterior shaft section and therefore the pitch of the helical spring, said indicating means being graduated to directly read delivery speed of the granular material from said indicated nut position.

References Cited in the file of this patent
UNITED STATES PATENTS

| | | |
|---|---|---|
| 1,041,524 | Snyder et al. | Oct. 15, 1912 |
| 1,653,594 | Thomas | Dec. 20, 1927 |
| 2,553,788 | Richardson et al. | May 22, 1951 |
| 2,652,954 | Nowak | Sept. 22, 1953 |
| 2,757,825 | Buhr | Aug. 7, 1956 |
| 2,840,275 | Liljenberg | June 24, 1958 |